United States Patent [19]

Wiers et al.

[11] 4,372,612

[45] Feb. 8, 1983

[54] INFINITELY VARIABLE SEAT RECLINER MECHANISM

[75] Inventors: John W. Wiers, Romeo; Daniel W. Roper, Rochester; Richard F. Johnson, Bloomfield Hills, all of Mich.

[73] Assignee: Rockwell International Corporation, Pittsburgh, Pa.

[21] Appl. No.: 173,778

[22] Filed: Jul. 30, 1980

[51] Int. Cl.³ ............................................. A47C 1/027
[52] U.S. Cl. ..................................... 297/374; 16/297; 16/324; 74/531
[58] Field of Search ............... 297/374, 376, 354, 355; 16/140, 141, 297, 324; 74/531; 188/70 B, 74, 82.1, 82.2, 82.7; 403/92, 95

[56] References Cited

U.S. PATENT DOCUMENTS

| 2,664,015 | 12/1953 | Moore | 74/531 |
| 2,703,499 | 3/1955 | Reid | 74/531 |
| 3,562,851 | 2/1971 | Koller | 16/140 |
| 4,219,234 | 8/1980 | Bell | 297/374 |

FOREIGN PATENT DOCUMENTS 1260755  4/1961  France ............................ 297/374

*Primary Examiner*—William E. Lyddane

[57] ABSTRACT

The invention consists of an infinitely variable seat reclining mechanism which is composed of a first arm attached to the seat cushion frame and a second arm attached to the seat back frame. A pivot pin rigidly secured to the second arm extends to at least one side thereof on an axis of rotation. The first arm is rotatably mounted on the pivot pin to be capable of relative rotation with respect to the second arm. A pair of locking pawls are rotatably mounted on the first arm. The locking pawls are capable of rotation toward and away from one another about separate pivot points and into contact with a circular friction surface on the second arm. The circular friction surface on the second arm has its center at the axis of rotation between the first and second arms. A spring is included for biasing the locking pawls toward one another. Each of the locking pawls has a substantially V-shaped groove on one end thereof which is capable of engaging the friction surface on the second arm. The friction surface also has a substantially V-shaped section with an included angle equal to the included angle of the grooves in the locking pawls. The interaction between the grooved surfaces on the locking pawls and on the second arm prevent relative rotation between the first and second arms. A lever arm is included for moving the locking pawls away from one another against the spring and out of engagement with the friction surface of the second arm thereby allowing relative rotation between the first and second arms.

4 Claims, 3 Drawing Figures

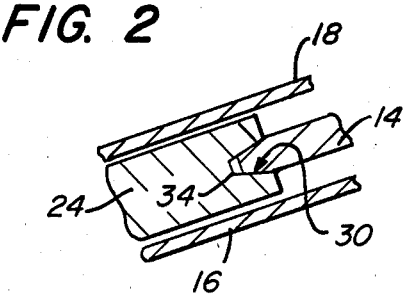
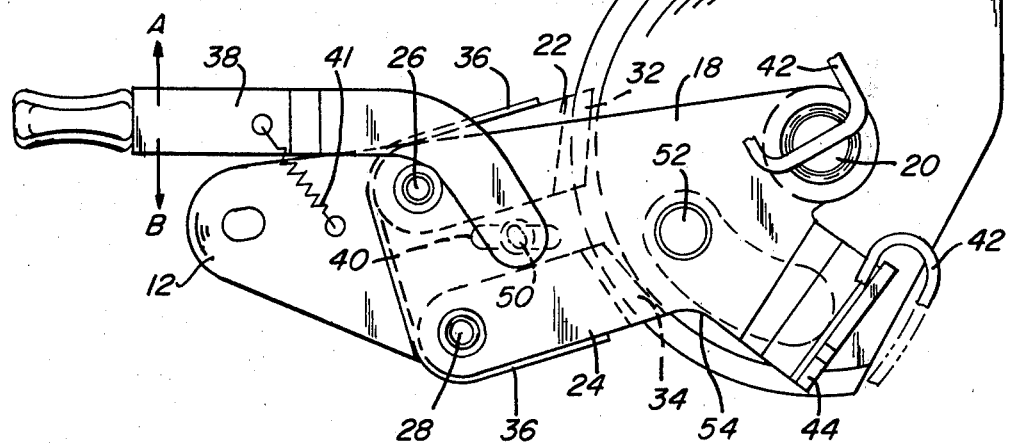

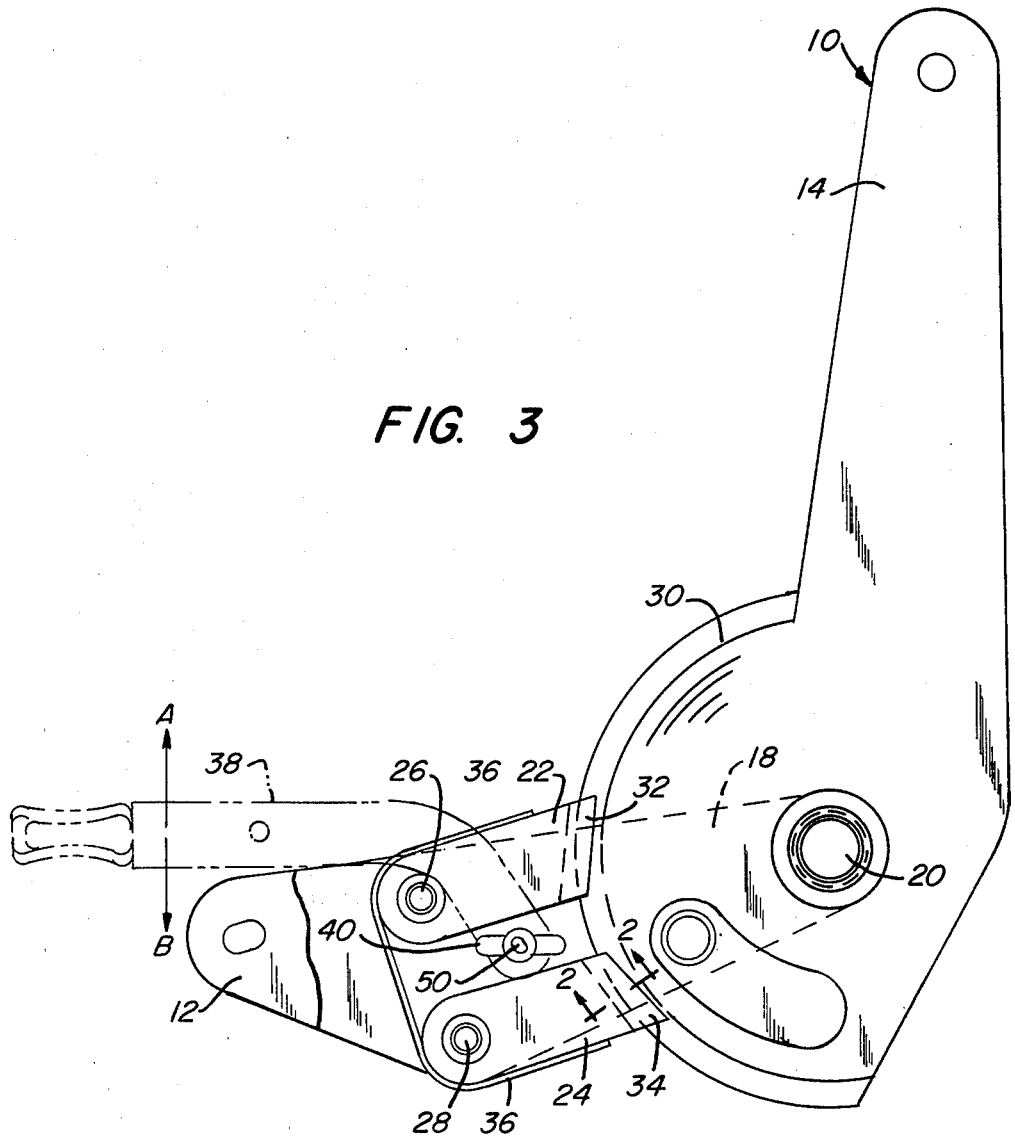

INFINITELY VARIABLE SEAT RECLINER MECHANISM

BACKGROUND OF THE INVENTION

1. Field of the Invention

The present invention relates to a mechanism for pivotally locating a vertical seat back with respect to an associated horizontal seat cushion in an adjustable manner. More specifically, the present invention relates to an automobile seat recliner which can be adjusted to locate a seat back in any given position.

2. Description of the Prior Art

Seat recliners are used with vehicle seats to control the angular orientation of a vehicle seat back with respect to an associated horizontal seat cushion. Adjustment of the angular orientation of the back with respect to the cushion affords a vehicle driver or passenger comfort in assuming a position that meets with the seat occupant's size and desired position while seated. Conventionally, recliners have been limited in the number of positions to which the seat back can be oriented with respect to the seat cushion. Also, when utilized with front seats in a vehicle of the "two-door" type, the seat back must be able to pivot forwardly independent of the seat cushion to an easy enter position to allow a person to enter or leave the rear seat behind the front seat.

There have hitherto been many examples of infinitely variable seat back adjusters. Many of these mechanisms have difficulty in producing a locking force which is great enough to withstand the impact loadings on the seat back required for occupant safety. In addition, many of these reclining mechanisms are very complicated and, consequently, expensive to mass produce.

An example of an infinitely variable seat back adjuster is that shown in U.S. Pat. No. 4,070,058, issued Jan. 24, 1978 to Anthony A. Muehling. This patent discloses a seat reclining mechanism mounted on the seat cushion and the seat back and contains a pair of cam members pivoting about a axis within a housing. These cam members engage a cam surface on one end and a locking surface on the other end so that rotation is resisted by the forcing of the cam member into locking engagement with the locking surface by attempted movement of the other cam surface. A mechanism of this type does not appear to produce the positive locking forces inherent in the present invention. Also, a large number of parts are required, thereby, making the seat reclining mechanism expensive to produce.

U.S. Pat. No. 3,423,785, issued Jan. 28, 1969 to J. Pickles discloses a position control mechanism which uses a cyclic gearing to produce substantial rotation of a friction drum upon limited rotation between the seat back and the seat cushion. The friction drum is bound with a spring coil which acts as a friction brake and, thereby, locks the seat back and seat cushion from relative rotation. Again, the locking forces developed by this scheme appear to be less than those developed by the seat reclining mechanism of the present invention. A similar seat reclining mechanism is shown in U.S. Pat. No. 3,508,294 which issued on Apr. 28, 1970 to the same inventor.

U.S. Pat. No. 3,315,298, issued Apr. 25, 1967 to W. Strien et al. discloses several embodiments each of which employ a helical camming surface on a rotatable plate to position an element fixedly attached to the seat back. Movement of the seat back is resisted by the element being moved generally perpendicular to the camming surface. Since only a small inclined angle exists between the element and the camming surface, the camming surface will not rotate because a friction force applied to the camming surface plate has a mechanical advantage due to the small angle. The forces produced by this scheme are still relatively less than the forces developed by the mechanism of the present invention. Furthermore, the helical surfaces are expensive to manufacture and not easily suitable for mass production.

U.S. Pat. No. 3,237,987, issued Mar. 1, 1966 to J. James discloses a locking mechanism which utilizes two sets of rollers each of which may be wedged between a cylindrical surface attached to seat back and a fixed inclined surface. Any movement of the seat back rearward or forward causes one or the other set of rollers to engage the inclined surface which further wedges the rollers against the cylindrical surface. The frictional forces thus developed keep the seat back from moving. Movement of a release mechanism in one direction will allow the seat to be moved in the opposite direction only since only one set of rollers can be displaced from the wedging surfaces at a time. It has been found that the mechanism of the present invention is far cheaper to mass produce than that disclosed in U.S. Pat. No. 3,237,987.

Other examples of infinitely variable seat reclining mechanisms are disclosed in U.S. Pat. Nos. 2,112,265 and 3,195,952.

The seat reclining mechanism of the present invention utilizes a self-energizing double wedge arrangement to effect locking. The inventor has used a similar idea in his limited slip differentials disclosed in U.S. Pat. Nos. 3,572,165 issued Mar. 23, 1971 and 3,762,241 issued Oct. 2, 1973. These patents deal with a clutch arrangement which would not suggest their use in a seat reclining mechanism.

SUMMARY OF THE INVENTION

It is an object of the present invention to provide an improved seat recliner that permits angular adjustment of a vehicle seat back with respect to an associated seat cushion in an infinitely variable manner.

It is a further object of this invention to provide a infinitely variable seat recliner which is capable of developing large locking forces to lock the seat back in the adjusted position under high load conditions.

It is still another object of this invention to provide a simple and lightweight mechanism which is capable of mass production at a relatively low cost.

It is yet an additional object of the present invention to provide a seat reclining mechanism which utilizes the friction developed by the interaction of two mating V-shaped surfaces when one of the V-shaped surfaces is forced into greater engagement with the second V-shaped surface upon movement of the second surface.

In carrying out the above objects and other objects of the present invention, the infinitely variable seat reclining mechanism includes a first and a second arm, with a pivot pin rigidly secured to the second arm to extend to at least one side thereof along an axis. The first arm is rotatably mounted on the pivot pin and is capable of relative rotation with respect to the second arm. A pair of locking pawls are rotatably mounted on the first arm, these locking pawls are capable of rotating towards and away from one another. The spring extends around the locking pawls and biases them toward one another. Each of the locking pawls has a substantially V-shaped groove on one end thereof. The end of the locking pawl with the V-shaped groove is capable of engaging a circular portion on the second arm. The circular portion of the second arm has a substantially V-shaped surface having an included angle substantially equal to the included angle of the grooves and the locking pawls. The biasing means forces the grooved ends on the locking pawls into frictional engagement with the V-shaped surface on the second arm, thereby, preventing relative rotation between the first arm and the second arm. Also included is a cam which is capable of forcing the locking pawls away from one another against the biasing means out of engagement with the V-shaped section on the second arm to allow relative rotation between the first and second arms. A spring is provided which biases the second arm towards the first arm.

These and further features and advantages of the present invention will become more clearly apparent from the following detailed description thereof which is to be read with reference to the accompanying drawings.

BRIEF DESCRIPTION OF THE DRAWINGS

FIG. 1 is a side view of the seat reclining mechanism of the present invention.

FIG. 2 is a section along Lines 2—2 of FIG. 3, showing the locking mechanism of the present invention.

FIG. 3 is a fragmentary view of the seat reclining mechanism shown in FIG. 1 with the outer plate removed.

DESCRIPTION OF THE PREFERRED EMBODIMENT

Referring to FIGS. 1 through 3 of the drawings, the seat reclining mechanism generally denoted as 10 includes a first arm 12 and a second arm 14. The first arm 12 is designed to be attached to the seat cushion of an automobile seat and arm 14 is to be attached to the seat back. In the preferred embodiment, the arms are bolted to the metal seat frame for rigid attachment to the cushion and the back.

THe first arm 12 is composed of two plates 16 and 18. The plates 16 and 18 capture the second arm 14 and a pivot pin 20 which serves as the center of rotation between the plates 16 and 18. Also rotatably mounted within the plates 16 and 18 are locking pawls 22 and 24. The pawls are mounted on pivot pins 26 and 28 respectively. The locking pawls 22 and 24 are capable of rotation toward and away from one another about pivot pins 26 and 28. The pivot pin 20 also serves to provide the proper spacing between plates 16 and 18.

In the preferred embodiment, the second arm 14 has a circular friction surface 30 thereon. The friction surface 30 has a radius of curvature centered at the axis of rotation between the plates 16 and 18 of first arm 12 and the second arm 14 which coincides with pivot pin 20. In the preferred embodiment, the friction surface 30 has a generally V-shaped cross section. The preferred locking pawls 22 and 24 have grooves 32 and 34 respectively cut in one end thereof. The grooves 32 and 34 have cross sections which are generally V-shaped and are substantially identical to the V-shaped friction surface on arm 14. In the preferred embodiment, the spring 36 urges the locking pawls 22 and 24 into engagement with the friction surface 30 on the second arm 14.

In the preferred embodiment the grooves 32 and 34 are cut straight at an angle with respect to a line joining pivot pins 20 and 26 or 28. This angle is such as to incure that the contact point between the grooves 32, 34 and the friction surface 30 of arm 14 is approximately centered in the A—B direction on the end of locking pawls 22 and 24. It can be seen that a curved groove could be cut in the ends of locking pawls 22 and 24. This curved groove would match the curvature of friction surface 30.

The locations of pivot pins 20, 26 and 28 are chosen so that the distance from pin 26 to the contact point of groove 32 of locking pawl 22 with the friction surface 30 is shorter than the radius of curvature of the circular friction surface 30. In other words, the combined length of the distance between pivot pin 26 and the contact point with friction surface 30 and the distance from pivot pin 20 to the same contact point between surface 30 and of pawl 22 is greater than the distance between pivot pins 26 and 20. The same geometry must exist for pawl 24 and its pivot pin 28. This geometry, which is similar to that of an overrunning clutch, insures that the mechanism will lock as is described in greater detail below.

A means is provided to force the locking pawls 22 and 24 away from one another against the spring 36 and out of engagement with the friction surface 30 on the second arm 14. In the preferred embodiment, this means includes a lever arm 38 which pivots the release cam 40 about pivot pin 26 to separate pawls 22 and 24. The cam 40 must be located far enough away from the pivot pins 26 and 28 so that the force applied to pawls 22 and 24 produces a sufficient moment to move the locking pawls out of engagement with surface 30 on arm 14. The spring 41 is provided to keep arm 38 in its normal operating position with the cam 40 disengaged from the locking pawls 22 and 24. The cam 40 is rigidly attached to arm 38 by a pin 50.

To operate the preferred seat reclining mechanism 10, release lever 38 is moved in direction A which rotates release cam 40 to force the locking pawls 22 and 24 out of engagement with friction surface 30 on arm 14. The occupant of the vehicle then adjusts the seat back to any desired position within a predetermined range. To lock the seat, the occupant releases lever 38, thereby, disengaging cam 40 from locking pawls 22 and 24. The spring 36 then forces the locking pawls back into engagement with the friction surface 30. The grooves 32 and 34 of locking pawls 22 and 24 contact the friction surface 30. Once in contact with the friction surface 30, attempted movement of arm 14 forward will cause movement of pawl 22 and consequently an increase in the locking forces between the arm 14 and the locking pawl 22. This is caused by the geometry discussed above in that the wedging forces between surface 30 and groove 32 increase in proportion to the forward force applied to arm 14. The locking force is transmitted down the pawl 22 and is resisted by pivot pin 26. Similarly, rearward motion of arm 14 is resisted by pawl 24 which is wedged into greater frictional engagement with friction surface 30 as rearward force is applied to arm 14. To reposition the angle of the seat back, the occupant releases the locking pawls by forcing them apart using arm 38 and cam surface 40. A pin 52 mounted on plates 16 and 18 and a slot 54 in arm 14 serve to limit the travel of the seat back relative to the seat cushion.

While a wide range of included angles for the grooves 32 and 34 and the friction surface 30 can be used, the preferred angle is approximately 18 degrees.

This angle is sufficient to cause sufficient locking forces between the friction surface 30 and the grooves 32 and 34 on pawls 22 and 24 respectively. It has been found that changing this angle requires the relocation of pivot points 26 and 28 to insure the easy unlocking of the mechanism 10. More specifically, it has been found that if the angle of the grooves 32, 34 and the friction surface 30 is reduced the distance between pivot points 26 and 28 must be increased, within the geometric framework stated above, to insure the forces required to disengage the locking pawls from the friction surface 30 are reasonable.

In the preferred embodiment, the pivot pin 20 is rigidly attached to second arm 14. The seat return spring 42 is provided and has one end attached to the pin 20 and a second end attached to a flange 44 on arm 18. The addition of spring 42 provides biasing of the seat back forward to enable easy adjustment of the seat back. Also, in the preferred embodiment, there is a slot in arm 14 which engages a pin in plates 16 and 18, the combination of which predetermines the maximum angle both forward and rearward that the seat back may take.

It can be seen that other shapes beside the substantially V-shaped cross section of the grooves 32 and 34 and the friction surface 30 could be utilized to produce locking engagement. For instance, a substantially U-shaped surface could be used on both the locking pawls and on the arm 14. In addition, various means could be provided to force the locking pawls 22 and 24 into engagement with the friction surface 30 other than the cam arm arrangement shown.

Although the invention has been illustrated and described with reference to the preferred embodiment thereof, we wish to have it understood that it is in no way limited to the details of such embodiments but is capable of numerous modifications within the scope of the appended claims.

We claim:

1. An adjustable positioning device comprising:
   a first member and a second member being pivotally connected to permit relative rotation of said members about an axis of rotation;
   second member having a circular friction surface thereon with its center at said axis of rotation;
   a pair of locking pawls pivotally mounted on said first member and being capable of rotation about spaced centers and into at least point contact at one end of each said pawl with said circular friction surface of said second member;
   means for biasing said locking pawls in opposite circumferential directions relative to said circular friction surface to urge said one end of each of said pawls into said point contact with said circular friction surface;
   each of said locking pawls having a grooved surface on said one end thereof, said friction surface of said second member having a cross section capable of mating with said grooved surface in said locking pawls, said biasing means tending to force said grooved surface of said one end of said locking pawls into wedging engagement with said friction surface of said second member whereby relative rotation between said first member and said second member in a first direction is prevented by the greater wedging engagement between one of said locking pawls and said friction surface and relative rotation in the other direction is prevented by the greater wedging engagement between the other of said locking pawls and said friction surface; and
   means for pivotally moving said locking pawls against said means for biasing and out of engagement with said friction surface of said second member to allow relative movement between said first member and said second member.

2. An infinitely adjustable seat recliner mechanism comprising:
   a first arm attached to the seat cushion frame;
   a second arm attached to the seat back frame;
   a pivot pin capable of acting as the axis of rotation between said first and second arms;
   a pair of locking pawls pivotally mounted on said first arm and being capable of rotation about spaced pivot points and into at least point contact at one end of each said pawl with a circular friction surface on an edge of said second arm, said circular friction surface having its center at said axis of rotation;
   means for biasing said locking pawls in opposite circumferential directions relative to said circular friction surface to urge said one end of each of said pawls into said point contact with said circular friction surface;
   each of said locking pawls having a substantially V-shaped groove in said one end thereof, said one end of said locking pawls with said V-shaped groove being capable of engaging said friction surface of said edge on said second arm, said friction surface having a substantially V-shaped cross section having a cross-sectional angle equal to an included angle of said grooves in said locking pawls whereby said one ends of said locking pawls are forced into frictional engagement with said friction surface with said V-shaped cross section on said second arm by said biasing means thereby preventing relative rotation between said first and second arms; and
   means for pivotally moving said locking pawls against said means for biasing and out of engagement with said friction surface on said second arm to allow relative rotation between said first and second arms;
   means for biasing said second arm toward said first arm; and
   means for limiting the relative rotation between said first and said second arm to a predetermined angle.

3. An infinitely adjustable seat reclining mechanism comprising:
   a first arm attached to the seat cushion frame;
   a second arm attached to the seat back frame;
   a pivot pin extending along an axis of rotation between said second arm, said first arm rotatably mounted on said pivot pin to be capable of relative rotation with respect to said second arm;
   a pair of locking pawls pivotally mounted on said first arm, said locking pawls capable of rotation towards and away from one another about spaced pivot points and into contact with a circular friction surface on said second arm, said circular friction surface having its center at said axis of rotation;
   means for biasing said locking pawls towards one another;
   each of said locking pawls having a substantially V-shaped surface on one end thereof, said end of said locking pawls with said V-shaped surface capable of engaging said friction surface on said second arm, said friction surface having a substantially V-shaped cross section complementary to said V-shaped surface on said locking pawls, said biasing means forces said locking pawls into contact with said friction surface on said second arm whereby said end on a first of said locking pawls is capable of being forced against its pivot point into greater wedging engagement with said friction surface on said second arm as said friction surface is forced toward the second of said locking pawls thereby preventing rotation between said first and second arms in one direction and said end on said second locking pawl is capable of being forced against its pivot point into greater engagement with said friction surface on said second arm as said second arm is forced toward said first locking pawl thereby preventing rotation between said first and second arms in the opposite direction;

means for moving said locking pawls away from one another against said biasing means and out of engagement with said friction surface of said second arm to allow relative rotation between said first and second arms; and said V-shaped surface on said locking pawl is a grooved surface.

4. An adjustable hinge comprising:

a first arm having a pair of locking pawls mounted thereon;

a second arm having a circular friction surface thereon;

a pivot pin extending along an axis of rotation between said first and said second arm and capable of permitting relative rotation therebetween about said axis;

said locking pawls capable of pivoting about spaced pivot points on said first arm into at least point contact with said friction surface on said second arm;

said pivot points on said first arm and said axis of rotation between said first and second arms located with respect to one another such that the sum of the distance from said contact point to said pawl pivot point and from said contact point to said pivot pin along said axis is greater than the respective distance between said pivot pin and said pawl pivot point;

means for biasing said locking pawls into locking engagement with said friction surface on said second arm whereby one of said locking pawls prevents said second arm from rotating in one direction and the other of said locking pawls prevents said second arm from rotating in the opposite direction;

means for moving said locking pawls out of engagement with said friction surface on said second arm to allow relative rotation between said first and second arms;

said frictions surface on said second arm has a substantially V-shaped cross section and the end of said locking pawl capable of rotating into contact with said friction surface has a cross section capable of mating with said friction surface; and said V-shaped surface on said locking pawl is a grooved surface.

* * * * *